United States Patent
Ely et al.

(10) Patent No.: US 7,218,539 B2
(45) Date of Patent: May 15, 2007

(54) TECHNIQUE FOR INCREASING POWER CAPABILITY OF A DC-TO-AC CONVERTER

(75) Inventors: Jeffrey A. Ely, Kokomo, IN (US); Brian J. Denta, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 249 days.

(21) Appl. No.: 11/086,689

(22) Filed: Mar. 22, 2005

(65) Prior Publication Data

US 2006/0215431 A1    Sep. 28, 2006

(51) Int. Cl.
*H02M 7/537* (2006.01)
(52) U.S. Cl. .......................... 363/131; 363/40
(58) Field of Classification Search ............ 363/16, 363/40, 41, 49, 131, 132
See application file for complete search history.

(56) References Cited

U.S. PATENT DOCUMENTS 5,631,819 A * 5/1997 Masaki et al. ............... 363/132
5,680,302 A * 10/1997 Iwata et al. .................. 363/132
2001/0017781 A1* 8/2001 Hideaki ......................... 363/16
2006/0171182 A1* 8/2006 Siri et al. ..................... 363/131

* cited by examiner

*Primary Examiner*—Jessica Han
(74) *Attorney, Agent, or Firm*—Jimmy L. Funke

(57) ABSTRACT

A power system that increases the power capability of a DC/AC converter includes a processor coupled to the DC/AC converter and a memory subsystem coupled to the processor. The memory subsystem stores code that when executed by the processor instructs the processor to perform a number of steps. The processor determines when an electrical load that is coupled to the DC/AC converter causes a link voltage of the DC/AC converter to fall below a first predetermined link voltage level. The processor then controls a DC/AC output inverter of the DC/AC converter to cause the DC/AC converter to provide a non-sinusoidal output waveform. The processor also controls the DC/AC output inverter to cause the DC/AC converter to provide a sinusoidal output waveform, when the link voltage exceeds the first predetermined link voltage level or a second predetermined link voltage level.

20 Claims, 3 Drawing Sheets

TECHNIQUE FOR INCREASING POWER CAPABILITY OF A DC-TO-AC CONVERTER

TECHNICAL FIELD

The present invention is generally directed to a DC-to-AC converter and, more specifically, to a technique for increasing power capability of a DC-to-AC converter that normally provides a sinusoidal output.

BACKGROUND OF THE INVENTION

Commercially available DC-to-AC (DC/AC) converters, e.g., 12 VDC to 120 VAC root-mean-square (RMS), 60 Hz converters, frequently have difficulty starting various electrical devices, e.g., televisions, motors, etc., that draw heavy currents when the devices are first powered. Further, commercially available DC/AC converters may also have difficulty supplying an appropriate link voltage to achieve a desired sinusoidal voltage during various other overload conditions. In general, when heavy start-up loads are applied, the converter DC link voltage may be loaded excessively and fall below the required value. This low link voltage, in turn, results in waveform distortion at the output of the DC/AC converter, which may result in suboptimal load starting performance.

Additionally, the link voltage of a converter may also fall below a required value during operation at times other than at start-up. In commercially available DC/AC converters, when the link voltage of the converter falls during a high load current situation, peak clipping of the output waveform of the converter usually results. Converters that are designed to maintain a RMS voltage or average voltage typically respond to the falling peak voltage by increasing a gain factor, to boost the non-peak portion of the output waveform, in an attempt to maintain the desired RMS voltage.

Unfortunately, the dV/dt (rise-time) in such a converter may become abnormally high, which can cause problems for some types of loads, such as those that rectify AC and charge a capacitor. In addition, commercially available DC/AC converters have generally not managed harmonic content of the output waveform, which can be problematic for magnetic devices, such as transformers and motors. Typical DC/AC converters have used a DC-to-DC (DC/DC) converter to boost a system voltage, e.g., 14 Volts DC, to a voltage above the peak of a desired sinusoidal output voltage, e.g., 170 Volts for a 120 Volt AC system. In such DC/AC converters, while an associated inverter is capable of delivering more power than its continuous rating for a brief period of time, subject to thermal limitations, the DC/DC converter is often not capable of sustaining the desired link voltage with the increased power delivery. Consequently, such DC/AC converters have required that the DC/DC converter be oversized in order to start or maintain operation of an associated load during an overload condition. Unfortunately, oversizing the DC/DC converter increases the overall cost of the DC/AC converter, which is undesirable.

What is needed is a technique for increasing the power capability of a DC/AC converter to better allow the converter to handle overload conditions that may occur at start-up or during operation of the converter.

SUMMARY OF THE INVENTION

The present invention is directed to a power system and method for increasing the power capability of a DC/AC converter. The power system includes a DC/AC converter, a processor coupled to the DC/AC converter and a memory subsystem coupled to the processor. The memory subsystem stores code that when executed by the processor instructs the processor to perform a number of steps. One step includes determining when an electrical load that is coupled to the DC/AC converter causes a link voltage of the DC/AC converter to fall below a first predetermined link voltage level. Another step includes controlling a DC/AC output inverter of the DC/AC converter to cause the DC/AC converter to provide a non-sinusoidal output waveform when the link voltage falls below the first predetermined link voltage level. Yet another step includes controlling the DC/AC output inverter of the DC/AC converter to cause the DC/AC converter to provide a sinusoidal output waveform when the link voltage exceeds the first predetermined link voltage level or a second predetermined link voltage level.

According to another embodiment, the first predetermined link voltage level is a level at which the link voltage is not adequate to allow the DC/AC converter to provide a desired root-mean square (RMS) voltage with a sinusoidal output waveform. According to another aspect of the present invention, a rise-time of the non-sinusoidal output waveform is substantially similar to that of a typical 120 VAC RMS, 60 Hz sinusoidal waveform. According to another aspect of the present invention, the step of controlling the DC/AC output inverter of the DC/AC converter to cause the DC/AC converter to provide a non-sinusoidal output waveform, when the link voltage falls below the first predetermined link voltage level, includes the step of: decreasing the rise-time of the output waveform as the peak voltage is approached to limit a peak current drawn by the load, which is a capacitive load.

According to another embodiment of the present invention, the step of controlling the DC/AC output inverter of the DC/AC converter to cause the DC/AC converter to provide a non-sinusoidal output waveform, when the link voltage falls below the first predetermined link voltage level, includes the steps of: maintaining an RMS value of the output waveform by holding a peak value for a first predetermined time period that is longer than a clipped waveform time period and controlling the DC/AC output inverter to transition to zero at the end of the first predetermined time period. According to yet another aspect of the present invention, the non-sinusoidal output waveform is a sawtooth-like waveform. According to a different embodiment of the present invention, the non-sinusoidal output waveform is altered during operation of the DC/AC converter in response to an overload condition. According to yet another embodiment of the present invention, the non-sinusoidal output waveform is also provided for a second predetermined period at restart of the DC/AC converter after an overload shutdown.

These and other features, advantages and objects of the present invention will be further understood and appreciated by those skilled in the art by reference to the following specification, claims and appended drawings.

BRIEF DESCRIPTION OF THE DRAWINGS

The present invention will now be described, by way of example, with reference to the accompanying drawings, in which.

DESCRIPTION OF THE PREFERRED EMBODIMENTS

Figure 1:
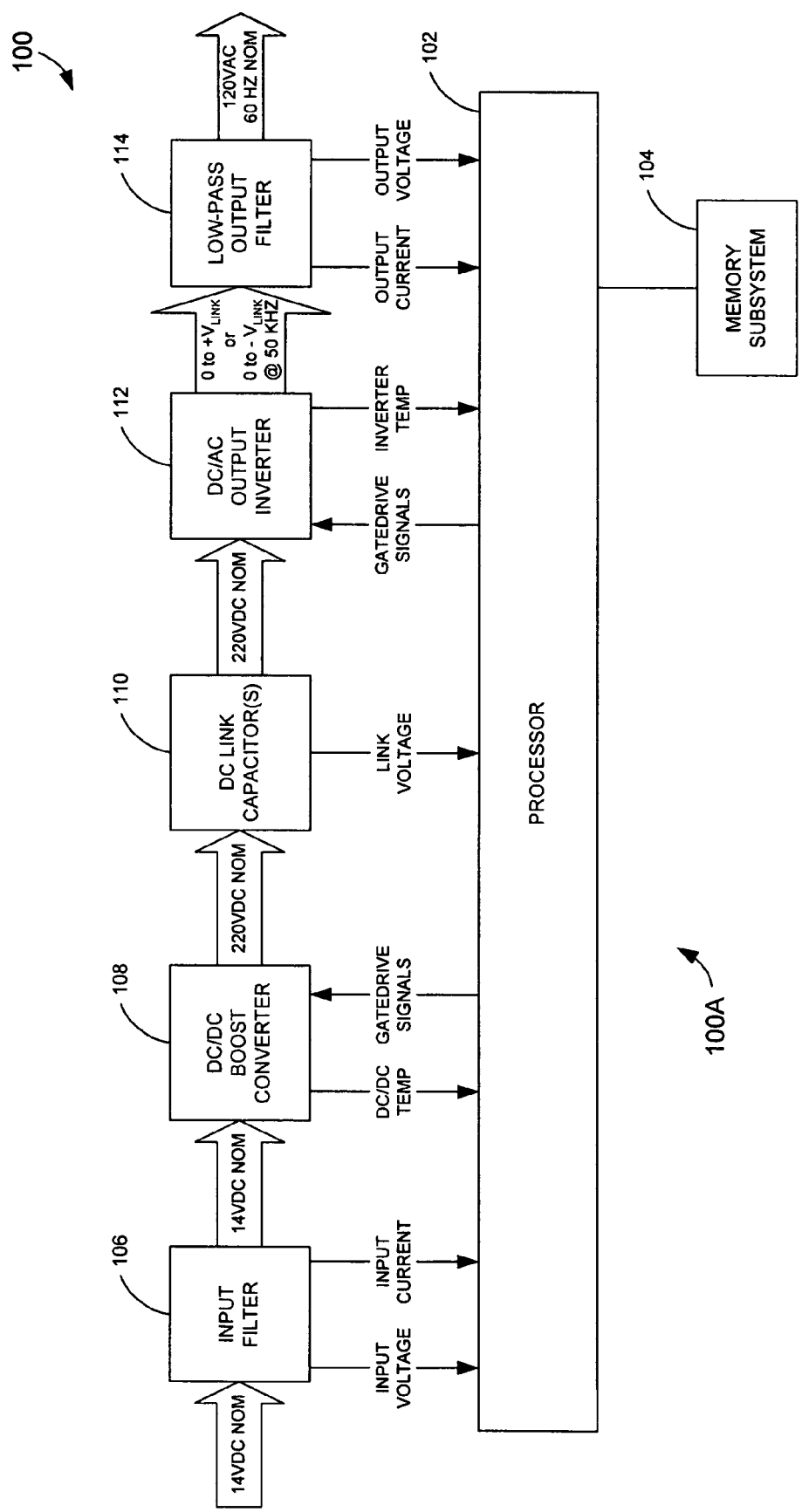
FIG. 1 is an exemplary electrical block diagram of a DC/AC converter constructed according to one embodiment of the present invention.

According to various embodiments of the present invention, a DC/AC converter is configured to include a processor and a memory subsystem. The implementation of the processor with the DC/AC converter allows for the analysis of load voltage and load current. The processor monitors various information, such as the voltage, current and phase information, and classifies the load, e.g., as an incandescent lamp, a motor, a rectifier/capacitor, etc., to determine a desired load waveform. If an overload occurs that causes or may cause shutdown, the DC/AC converter utilizes the load analysis information to adapt to a waveform that is more tolerant of lower link voltages for starting, restarting or preventing shutdown of the detected load type. The processor may then control the DC/AC converter to provide the load with the selected waveform. The altered waveform may be utilized for a specific time period, e.g., twenty seconds, to allow adequate time for an operator to manually attempt to restart a manually started load.

After the overload condition is taken care of, the processor is programmed to cause the DC/AC converter to revert to providing a normal output waveform, after the predetermined time period. It should be appreciated that the concept described herein is not restricted to a specific set of waveforms and broadly encompasses the concept of load classification and the use of optimal waveforms to restart loads or service overload conditions. For example, with a resistive load, e.g., an incandescent lamp or a universal motor, a square waveform may be utilized. An inductive load, such as an induction motor, may utilize a sinusoid waveform, even if under amplitude. A capacitive/high peaking factor load, e.g., DC/AC converters/adapters, may utilize a limited rise-time waveform, such as a sawtooth-like waveform.

Alternatively, the processor may not analyze the load, but simply distort the waveform to a best-guess compromise, when the link voltage falls. The use of optimized waveforms allows the available energy to be used more effectively in starting or restarting a specific load type and, thus, increases the ability to start or restart difficult loads with a given converter size. In sum, when the DC/AC converter experiences a low link voltage, an alternative waveform is utilized that is optimized for driving a specific detected load type.

As discussed above, characteristics for the waveform may vary, depending upon the power level and intended usage of the inverter. However, a typical waveform may have a limited rise-time, such that the peak rise-time (dV/dt) does not significantly exceed what is normally provided by a 120 VAC RMS sinusoidal power system. In such a system, the waveform might be controlled to decrease the dV/dt to some degree, as the peak voltage is approached, in order to limit peak currents on rectifier/capacitor type loads. It should be appreciated that a generic waveform alternative may be implemented by holding the peak value longer to maintain the RMS voltage, which would typically be the case of a clipped sinusoidal waveform.

In this case, the fall of the output to zero is desirably abrupt, such that the waveform looks similar to a sawtooth-like waveform. It should be appreciated that it may be desirable that the waveform switching logic exhibit some hysteresis to avoid switching back and forth between waveforms during minor variations in link voltage. It should also be appreciated that this concept can be applied as a continuous function of the link voltage and, thus, in this manner, service brief running overloads. In this context, multiple alternative waveforms or a continuously variable waveform allows only a slightly distorted sine wave, i.e., a sinusoidal rise, with an extended peak and a faster fall time, to be used in situations where the link voltage is only slightly below a desired level. A more severe sawtooth-like waveform may be utilized when the link voltage is below a second desired level and an almost square waveform may be utilized as the link voltage goes below a third predetermined level. Further, the waveform alteration may be continuous in nature and not zoned into discrete areas with distinctly different waveforms.

With reference to FIG. 1, a block diagram of an exemplary power system 100A having a DC/AC converter 100 is illustrated. As is shown, the converter 100 includes an input filter 106 that receives a DC voltage, e.g., 14 VDC, from a battery that is coupled to the input of the filter 106, whose output is coupled to an input of a DC/DC boost converter 108. An output of the DC/DC boost converter 108 is coupled to an input of a DC link capacitor(s) 110, whose output is coupled to a DC/AC output inverter 112. An output of the DC/AC inverter 112 is coupled to an input of a low-pass output filter 114, which optimally provides at its output a 120 VAC RMS, 60 Hz nominal sinusoidal waveform.

A processor 102 is coupled to the input filter 106, the DC/DC boost converter 108, the DC link capacitor(s) 110, the DC/AC output inverter 112 and the low-pass output filter 114. As used herein, the term processor may include a general purpose processor, a microcontroller (i.e., an execution unit with memory, etc., integrated within a single integrated circuit), an application specific integrated circuit (ASIC), a programmable logic device (PLD) or a digital signal processor (DSP). The processor 102 is also coupled to a memory subsystem 104, which includes an application appropriate amount of volatile and non-volatile memory. The processor 102 runs various routines that allow it to monitor the input voltage and current at the input filter 106. The processor 102 provides gate drive signals to the converter 108, which cause the output of the converter 108 to go to a desired voltage. The processor 102 monitors the link voltage across the DC link capacitor(s) 110 of the DC/AC output inverter 112. The processor 102 is also programmed to provide gate drive signals to the inverter 112, such that the inverter 112 provides an appropriate output signal at its output, e.g., 50 KHz pulse width modulated (PWM) signal that varies between a positive link voltage and zero or zero and a negative link voltage or other signal that can be readily filtered to a 120 VAC RMS, 60 Hz or 50 Hz (Europe) sinusoidal waveform. The processor 102 also monitors the output current and voltage at the low-pass output filter 114.

As previously mentioned, the processor 102 is programmed to increase the power capability of the DC/AC converter 100 by initiating a number of steps. One step includes determining when an electrical load that is coupled to the DC/AC converter causes the link voltage of the DC/AC converter to fall below a first predetermined link voltage level, e.g., 180 VDC. The processor 102 then controls the DC/AC output inverter 112 of the DC/AC converter 100 to cause the DC/AC converter to provide a load appropriate non-sinusoidal output waveform, when the link voltage falls below the first predetermined link voltage level. As is discussed above, the non-sinusoidal output waveform may take a variety of forms, such as a square waveform, a sawtooth-like waveform, a modified sinusoidal waveform, etc. The processor 102 also controls the DC/AC output inverter 112 to cause the converter 100 to provide a sinusoidal output waveform when the link voltage exceeds the first predetermined link voltage level or a second predetermined link voltage level, e.g., 170 VDC.

Figure 2:
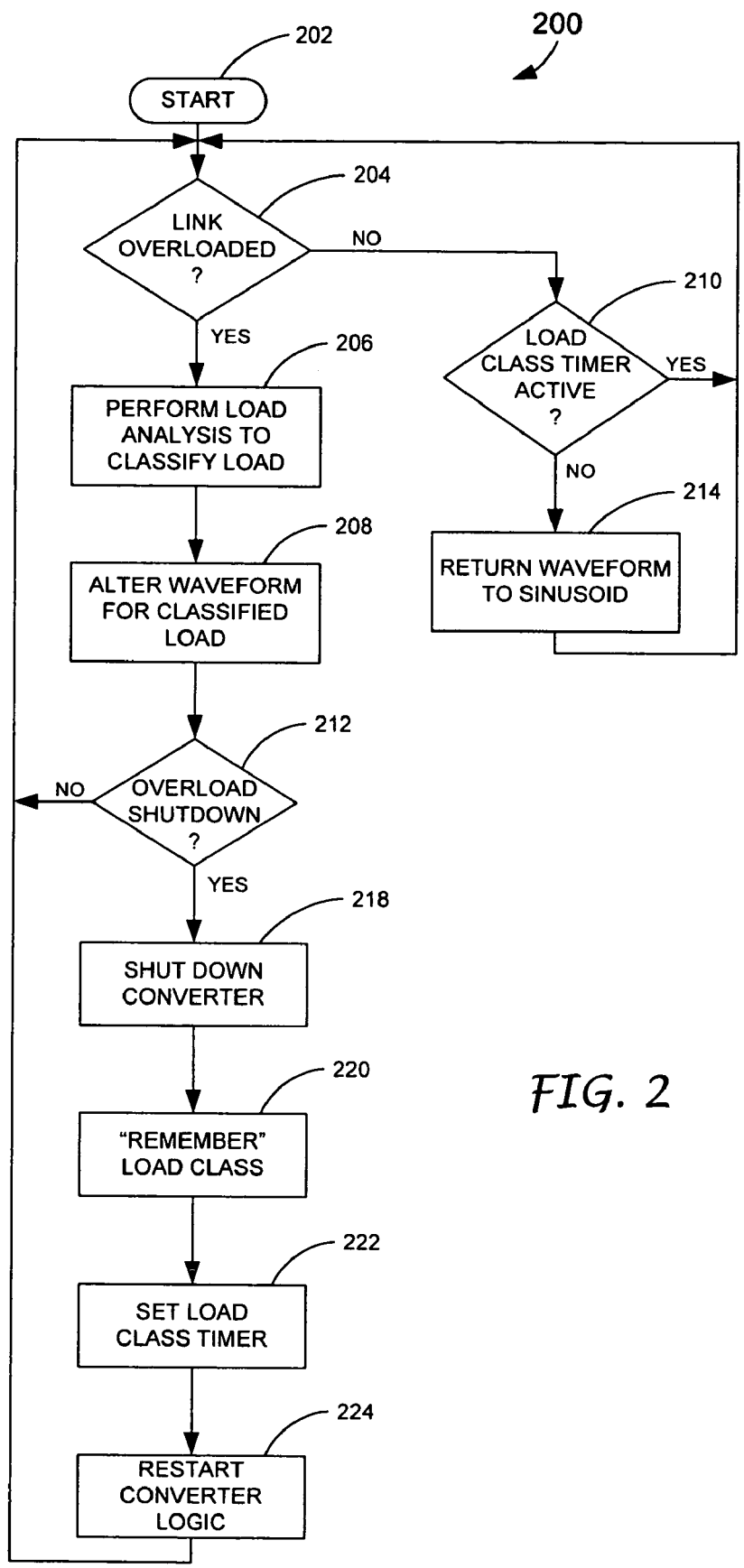
FIG. 2 is a flow diagram of an exemplary load monitoring routine according to one embodiment of the present invention.

With reference to FIG. 2, an exemplary flow chart for a load monitoring routine 200 is shown. The routine 200 is initiated in step 202, at which point control transfers to decision step 204. In step 204, the processor 102 determines whether the link voltage, provided by the DC link capacitor (s) 110, is below a first predetermined level, e.g., 180 VDC. Providing the link voltage is above the first predetermined level, the processor 102 determines that the load has not caused an overload condition of the converter 100 and control then transfers to decision step 210. In step 210, when the load classification timer is active, control returns to step 204.

Otherwise, when the load classification timer is not active in step 210, control transfers to step 214, where the processor 102 causes the waveform to return to a sinusoidal waveform, after expiration of a time period (e.g., twenty seconds) associated with the load classification timer, by controlling the DC/AC output inverter 112, via the gate drive signals provided to the inverter 112, before returning control to step 204. In the event that an overload condition exists in step 204, control transfers to step 206, where the processor 102 performs a load analysis to analyze the load and determine what type of load the converter 100 is currently servicing.

The processor 102 may determine the load type by examining the output current and voltage provided by the low-pass output filter 114. Next, in step 208, the processor 102 causes an output waveform of the converter 100 to be altered, as appropriate, for the classified load, based upon the current and voltage provided to the load by the low-pass output filter 114. In this manner, the processor 102 utilizes a modified waveform, i.e., a waveform that is not a sinusoidal waveform, in an attempt to optimally utilize an available link voltage. Next, in decision step 212, the processor 102 determines whether the overload condition still exists. If the overload condition no longer exists in step 212, control returns to step 204. If the overload condition still exists in step 212, control transfers from step 212 to step 218, where the processor causes the converter 100 to be shutdown.

Next, in step 220, the processor 102 recalls the load class and in step 222 sets a load class timer. Then, in step 224, the processor attempts to restart the converter 100. In general, the predetermined link voltage level at which the non-sinusoidal waveform is selected corresponds to a link voltage that is not adequate to allow the DC/AC converter 100 to provide a sinusoidal output signal with a desired root-mean square (RMS) voltage level.

Figure 3:
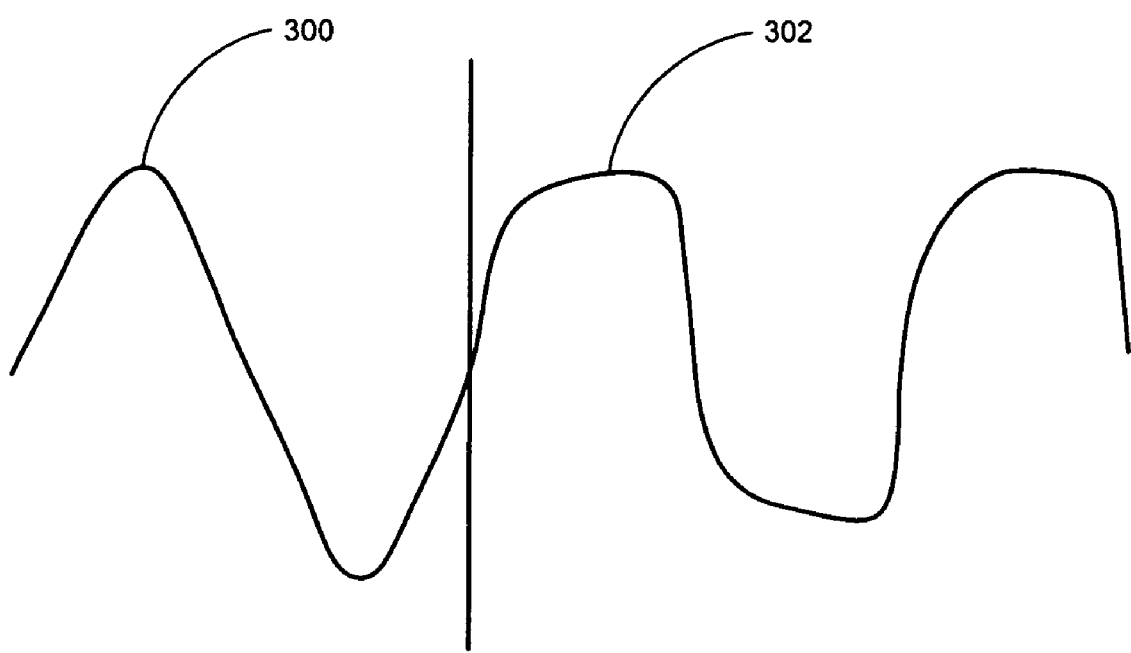
FIG. 3 is an exemplary waveform provided at an output of a DC/AC converter provided according to one embodiment of the present invention.

Referencing FIG. 3, the rise-time of a non-sinusoidal output waveform 302 may be substantially similar to that of a typical 120 VAC RMS, 60 Hz sinusoidal waveform 300, when a load fails to start or an overload condition occurs. In this case, the processor 102 may decrease a rise-time of the output waveform 302 as a peak voltage is approached to eliminate peak current drawn by the load. Further, the processor 102 may maintain an RMS value of the output waveform 302 by holding a peak value for a first predetermined time period that is longer than a clipped waveform time period that would typically be provided by a prior art converter. The processor 102 may also control the DC/AC output inverter 112 to transition to zero at the end of the first predetermined time period or at the end of a second predetermined time period.

As is discussed above, the non-sinusoidal waveform may take a variety of other forms, such as a sawtooth-like waveform or a square waveform, depending upon the type of load to which the output of the converter 100 is coupled. The non-sinusoidal output waveform may also be altered by the processor 102 during operation of the converter 100 in response to an overload condition. As is discussed above, the non-sinusoidal output waveform may be limited to a second predetermined time period at the start-up of the DC/AC converter.

Accordingly, a technique for increasing the power capability of a DC/AC converter has been disclosed herein. A DC/AC converter so constructed is particularly advantageous when implemented within motor vehicles, which increasingly have utilized inverters to provide AC for various devices that consumers desire to power from an automotive environment.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

The invention claimed is:

1. A method for increasing power capability of a DC/AC converter, comprising the steps of:
   determining when an electrical load that is coupled to a DC/AC converter causes a link voltage of the DC/AC converter to fall below a first predetermined link voltage level;
   controlling a DC/AC output inverter of the DC/AC converter to cause the DC/AC converter to provide a non-sinusoidal output waveform when the link voltage falls below the first predetermined link voltage level; and
   controlling the DC/AC output inverter of the DC/AC converter to cause the DC/AC converter to provide a sinusoidal output waveform when the link voltage exceeds the first predetermined link voltage level or a second predetermined link voltage level.

2. The method of claim 1, wherein the first predetermined link voltage level is a level at which the link voltage is not adequate to allow the DC/AC converter to provide a desired root-mean square (RMS) voltage with a sinusoidal output waveform.

3. The method of claim 1, wherein a rise-time of the non-sinusoidal output waveform is substantially similar to that of a typical 120 VAC RMS, 60 Hz sinusoidal waveform.

4. The method of claim 1, wherein the step of controlling a DC/AC output inverter of the DC/AC converter to cause the DC/AC converter to provide a non-sinusoidal output waveform when the link voltage falls below the first predetermined link voltage level includes the step of:
   decreasing a rise-time of the output waveform as the peak voltage is approached to limit a peak current drawn by the load, wherein the load is a capacitive load.

5. The method of claim 1, wherein the step of controlling a DC/AC output inverter of the DC/AC converter to cause the DC/AC converter to provide a non-sinusoidal output waveform when the link voltage falls below the first predetermined link voltage level includes the step of:

maintaining a root-mean square (RMS) value of the output waveform by holding a peak value for a first predetermined time period, wherein the first predetermined time period is longer than a clipped waveform time period; and controlling the DC/AC output inverter to transition to zero at the end of the first predetermined time period.

6. The method of claim 1, wherein the non-sinusoidal output waveform is a sawtooth-like waveform.

7. The method of claim 1, wherein the non-sinusoidal output waveform is altered during operation of the DC/AC converter in response to an overload condition.

8. The method of claim 1, wherein the non-sinusoidal output waveform is also provided for a second predetermined period at restart of the DC/AC converter after an overload shutdown.

9. A power system, comprising:
DC/AC converter;
a processor coupled to the DC/AC converter; and
a memory subsystem coupled to the processor, the memory subsystem storing code that when executed by the processor instructs the processor to perform the steps of:
  determining when an electrical load that is coupled to the DC/AC converter causes a link voltage of the DC/AC converter to fall below a first predetermined link voltage level;
  controlling a DC/AC output inverter of the DC/AC converter to cause the DC/AC converter to provide a non-sinusoidal output waveform when the link voltage falls below the first predetermined link voltage level; and
  controlling the DC/AC output inverter of the DC/AC converter to cause the DC/AC converter to provide a sinusoidal output waveform when the link voltage exceeds the first predetermined link voltage level or a second predetermined link voltage level.

10. The system of claim 9, wherein the first predetermined link voltage level is a level at which the link voltage is not adequate to allow the DC/AC converter to provide a desired root-mean square (RMS) voltage with a sinusoidal output waveform.

11. The system of claim 9, wherein a rise-time of the non-sinusoidal output waveform is substantially similar to that of a typical 120 VAC RMS, 60 Hz sinusoidal waveform.

12. The system of claim 9, wherein the step of controlling a DC/AC output inverter of the DC/AC converter to cause the DC/AC converter to provide a non-sinusoidal output waveform when the link voltage falls below the first predetermined link voltage level includes the step of:
  decreasing a rise-time of the output waveform as the peak voltage is approached to limit a peak current drawn by the load, wherein the load is a capacitive load.

13. The system of claim 9, wherein the step of controlling a DC/AC output inverter of the DC/AC converter to cause the DC/AC converter to provide a non-sinusoidal output waveform when the link voltage falls below the first predetermined link voltage level includes the step of:

maintaining a root-mean square (RMS) value of the output waveform by holding a peak value for a first predetermined time period, wherein the first predetermined time period is longer than a clipped waveform time period; and controlling the DC/AC output inverter to transition to zero at the end of the first predetermined time period.

14. The system of claim 9, wherein the non-sinusoidal output waveform is a sawtooth-like waveform.

15. The system of claim 9, wherein the non-sinusoidal output waveform is altered during operation of the DC/AC converter in response to an overload condition.

16. The system of claim 9, wherein the non-sinusoidal output waveform is also provided for a second predetermined period at restart of the DC/AC converter after an overload shutdown.

17. A power system, comprising:
DC/AC converter;
a processor coupled to the DC/AC converter; and
a memory subsystem coupled to the processor, the memory subsystem storing code that when executed by the processor instructs the processor to perform the steps of:
  determining when an electrical load that is coupled to the DC/AC converter causes a link voltage of the DC/AC converter to fall below a first predetermined link voltage level;
  controlling a DC/AC output inverter of the DC/AC converter to cause the DC/AC converter to provide a non-sinusoidal output waveform when the link voltage falls below the first predetermined link voltage level; and
  controlling the DC/AC output inverter of the DC/AC converter to cause the DC/AC converter to provide a sinusoidal output waveform when the link voltage exceeds the first predetermined link voltage level or a second predetermined link voltage level, wherein the predetermined link voltage level is a level at which the link voltage is not adequate to allow the DC/AC converter to provide a desired root-mean square (RMS) voltage with a sinusoidal output waveform, and wherein the non-sinusoidal waveform is one of a square waveform and a sawtooth-like waveform.

18. The system of claim 17, wherein a rise-time of the non-sinusoidal output waveform is substantially similar to that of a typical 120 VAC RMS, 60 Hz sinusoidal waveform.

19. The system of claim 17, wherein the non-sinusoidal output waveform is altered during operation of the DC/AC converter in response to an overload condition.

20. The system of claim 17, wherein the non-sinusoidal output waveform is only provided for a second predetermined period at start-up of the DC/AC converter.

* * * * *